United States Patent
Shirataki et al.

(10) Patent No.: US 7,740,118 B2
(45) Date of Patent: Jun. 22, 2010

(54) ROLLER-TYPE ONE-WAY CLUTCH

(75) Inventors: Hirobumi Shirataki, Fukuroi (JP); Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 366 days.

(21) Appl. No.: 11/783,384

(22) Filed: Apr. 9, 2007

(65) Prior Publication Data
US 2007/0246318 A1 Oct. 25, 2007

(30) Foreign Application Priority Data
Apr. 10, 2006 (JP) .............................. 2006-107141

(51) Int. Cl.
*F16D 13/04* (2006.01)
(52) U.S. Cl. .................................... 192/45; 192/107 T
(58) Field of Classification Search ................. 192/56.1
See application file for complete search history.

(56) References Cited

U.S. PATENT DOCUMENTS 3,104,744 A * 9/1963 Wade .......................... 192/45
3,718,212 A * 2/1973 Havranek ..................... 192/45
7,147,091 B2 12/2006 Iga et al.
2002/0046914 A1* 4/2002 Saiko .......................... 192/38
2005/0217959 A1 10/2005 Iga et al.
2006/0137955 A1 6/2006 Shirataki et al.

FOREIGN PATENT DOCUMENTS

JP 9-229096 9/1997

* cited by examiner

*Primary Examiner*—David D Le
*Assistant Examiner*—Ryan Dodd
(74) *Attorney, Agent, or Firm*—Miles & Stockbridge P.C.

(57) ABSTRACT

The present invention provides, a roller-type one-way clutch comprising an annular outer race provided at its inner periphery with a cam surface, an inner race spaced apart from the outer race in a radially inner diameter side and disposed in coaxial with the outer race for a relative movement therewith and having an annular outer peripheral track surface, a plurality of rollers disposed between the outer race and the inner race and adapted to transmit torque between the outer peripheral track surface and the cam surface, a cage for holding the plurality of rollers, and a C-shaped annular spring for biasing the rollers toward a direction in which the rollers are engaged by the cam surface, through the cage, and wherein the C-shaped annular spring is assembled in a diameter-enlarged condition.

6 Claims, 2 Drawing Sheets

ROLLER-TYPE ONE-WAY CLUTCH

BACKGROUND OF THE INVENTION

1. Field of the Invention

The present invention relates to a roller-type one-way clutch used, for example, as a part for transmitting torque or as a back stopper in a driving apparatus of motor vehicles, industrial machines and the like.

2. Description of the Related Art

In general, a roller-type one-way clutch comprises an outer race, an inner race disposed in coaxial with the outer race, a plurality of rollers disposed between an outer peripheral surface of the inner race and an inner peripheral cam surface of the outer race and adapted to transmit torque, and springs contacted with the rollers at an idle rotation side.

In the one-way clutch having such an arrangement, the inner race is rotated in only one direction with respect to the outer race by a cam mechanism constituted by the rollers and the cam surface. That is to say, it is designed so that the inner race is idly rotated with respect to the outer race in one direction and can transmit rotational torque to the outer race through the cam mechanism only in the other direction.

In general, in the roller-type one-way clutch, it is required to design so that, even if abrupt engagement is generated, all of the rollers must be engaged positively. For example, even under severe used conditions such as an environment where the clutch is exposed to high vibration and/or a very low temperature, in order to ensure the engaging ability of the roller-type one-way clutch, it is necessary to considerably increase an urging force (drug torque) of each of the springs for biasing the rollers toward the engaging direction. However, by doing so, it is feared that there arise problems regarding drag loss and wear during the idle rotation.

Further, in a roller type one-way clutch for motor bicycles, since the number of rollers is small (for example, three or six), if all of the rollers are not engaged positively, it is feared that required design torque capacity cannot be obtained.

As disclosed in Japanese Patent Application Laid-open No. 9-229096 (1997), the rollers are biased toward the engaging direction by the spring so that the rollers are engaged by the cam surface of the outer race. In this case, the number of springs corresponding to the number of rollers must be provided; however, in such a case, due to dispersion in properties of the springs, it was difficult to synchronize the rollers.

SUMMARY OF THE INVENTION

An object of the present invention is to provide a one-way clutch in which all of rollers can be synchronized uniformly and, even under an environmental condition having high vibration encountered by motor bicycles and the like, all of the rollers can be engaged positively.

To achieve the above object, the present invention provides a roller-type one-way clutch comprising an annular outer race provided at its inner periphery with a cam surface, an inner race spaced apart from the outer race in a radially inner diameter side and disposed in coaxial with the outer race for a relative movement therewith and having an annular outer peripheral track surface, a plurality of rollers disposed between the outer race and the inner race and adapted to transmit torque between the outer peripheral track surface and the cam surface, a cage for holding the plurality of rollers, and a C-shaped annular spring for biasing the rollers toward a direction in which the rollers are engaged by the cam surface, through the cage, and wherein the C-shaped annular spring is assembled in a diameter-enlarged condition.

According to the present invention, the following advantages can be obtained.

Since all of the rollers can be synchronized uniformly (full phasing function), even under an environmental condition having high vibration encountered by motor bicycles, all of the rollers can be engaged positively.

Further, since it is not required to provide respective leaf springs or coil springs and caps for corresponding rollers, the number of parts cab be reduced and operability can be improved and an assembling ability can be enhanced.

Particularly, it is possible to reduce the drag torque during the high rotation, to reduce fuel consumption and to prevent wear between the rollers and the inner race.

Further, since side plates are not required, the number of parts can be reduced. Engagement reliability is enhanced and an engaging feature enduring against shock or impact torque is also enhanced. Further, even if excessive torque is applied, damage of parts can be reduced. In the roller-type one-way clutch, it is designed so that, when torque greater than predetermined torque is applied, an engaging angle is increased abruptly, thereby escaping the excessive torque. In this way, a roller-type one-way clutch in which rollers are prevented from being dislodged and the assembling of the clutch is facilitated can be provided.

Further features of the present invention will become apparent from the following description of exemplary embodiments with reference to the attached drawings.

DESCRIPTION OF THE EMBODIMENTS

Figure 1:
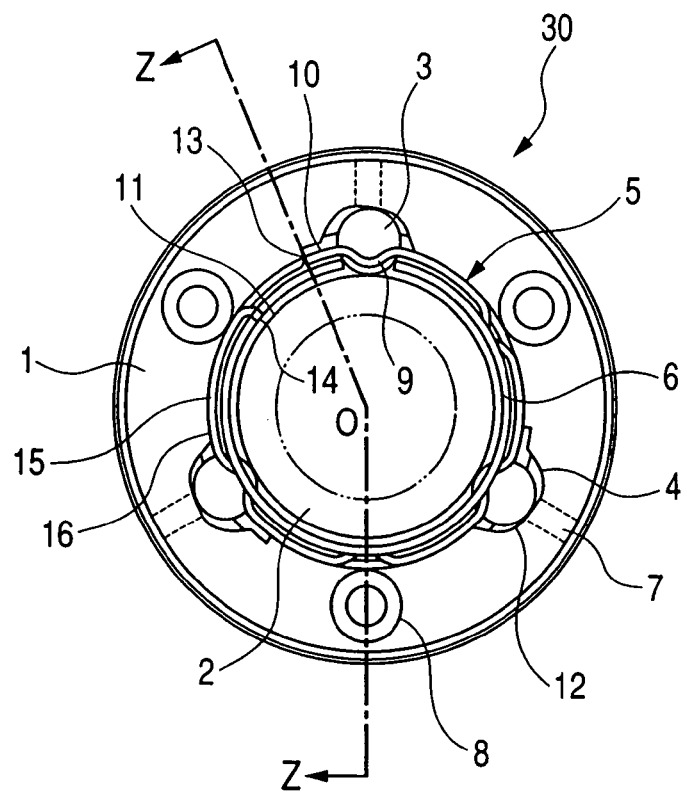
FIG. 1 is a front view of a roller-type one-way clutch according to an embodiment of the present invention.

Now, the present invention will be fully explained with reference to the accompanying drawings. Incidentally, it should be noted that an embodiment which will be described hereinafter are merely an example, but does not limit the present invention. Further, in the drawings, the same or similar elements are designated by the same or similar reference numerals.

Figure 2:
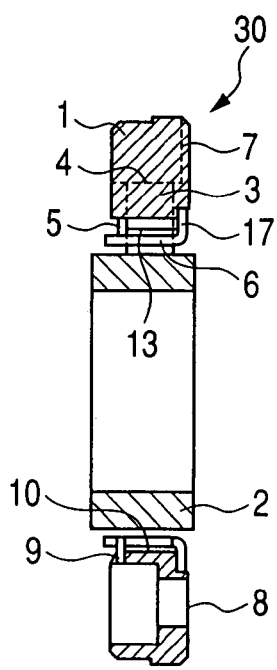
FIG. 2 is an axial sectional view taken along the line Z-O-Z in FIG. 1.

FIG. 1 is a front view of a roller-type one-way clutch 30 according to an embodiment of the present invention. Further, FIG. 2 is a sectional view taken along the line Z-O-Z in FIG. 1.

A roller-type one-way clutch 30 comprises an annular outer race 1 which is provided at its inner periphery with recessed portions 4 having cam surfaces 12, an inner race 2 spaced apart from the outer race 1 in a radially inner diameter side and disposed in coaxial with the outer race for a relative movement therewith and having an annular outer peripheral track surface 11, a plurality of rollers 3 disposed between the outer race 1 and the inner race 2 and adapted to transmit torque between the outer peripheral track surface 11 and the cam surfaces 12, a cage 6 for holding the plurality of rollers 3, and a C-shaped annular spring 5 for biasing the rollers 3 toward a direction in which the rollers 3 are engaged by the cam surfaces 12, through the cage 6.

Three recessed portions 4 are provided in the outer race 1 equidistantly along a circumferential direction. Further, three axial through-holes 8 used for securing the outer race 1 to output and input members (not shown) are also provided in the outer race equidistantly along the circumferential direction. As shown in FIG. 1, the recessed portions 4 and the through-holes 8 are disposed alternately and equidistantly. Further, it should be noted that three to six recessed portions and through-holes can be used in accordance with the magnitude of the torque.

The cage 6 is provided with pocket portions 10 passing through the cage in a radial direction. The rollers 3 are rotatably or swingably received in the corresponding pocket portions 10.

Further, the C-shaped annular spring 5 is disposed between the outer race 1 and the inner race 2. In this case, the C-shaped annular spring 5 is assembled in a diameter enlarged condition in comparison with an original or standard diameter condition. Thus, the rollers 3 are biased (urged) toward an engaging direction through the cage 6 by a restoring force, or a diameter-reducing force of the enlarged annular spring 5, thereby generating required torque. Accordingly, the drag torque can be reduced in proportion to the number of revolutions of the outer race 1. Further, since a centrifugal force of the outer race 1 acts in a direction along which the annular spring 5 is enlarged, thereby weakening the biasing force of the cage 6, due to the centrifugal force, when the annular spring 5 is enlarged, the biasing force acting on the rollers 3 is weakened.

The annular spring 5 has both ends 13 and 14 and is divided or split between the both ends; however, the spring has a substantially annular structure as a whole. Further, the annular spring 5 has a plurality of curved portions 9 protruding toward the inner diameter side and disposed equidistantly in the circumferential direction. The curved portions 9 disposed equidistantly along the circumferential direction are fitted into the corresponding pocket portions 10 of the cage 6. That is to say, as can be seen in FIG. 1, the curved portions 9 are fitted into the pocket portions 10 together with the rollers 3. Only the curved portions 9 are fitted into the pocket portions 10 between the rollers 3.

In this way, by engaging the curved portions 9 of the C-shaped annular spring 5 with the pocket portions 10 of the cage 6, the annular spring 5 can be prevented from dislodging in the axial direction. Further, since any side plates are not required, the number of parts can be reduced.

As mentioned above, although the curved portions 9 of the annular spring 5 are protruded toward the inner race 2, preferably, a protruded amount of each curved portion is selected so that the curved portion 9 does not contact with the outer peripheral track surface 11 of the inner race 2 in order to prevent the annular spring 5 from being rotated together with the inner race.

Further, an urging force for engaging the rollers 3 with the cam surfaces 12 is transmitted from the annular spring 5 to the rollers 3 through the cage 6. That is to say, the restoring force of the C-shaped annular spring 5 is applied to the rollers 3 indirectly. Thus, it is not required to provide respective leaf springs or coil springs and caps for the corresponding rollers 3.

Figure 3:
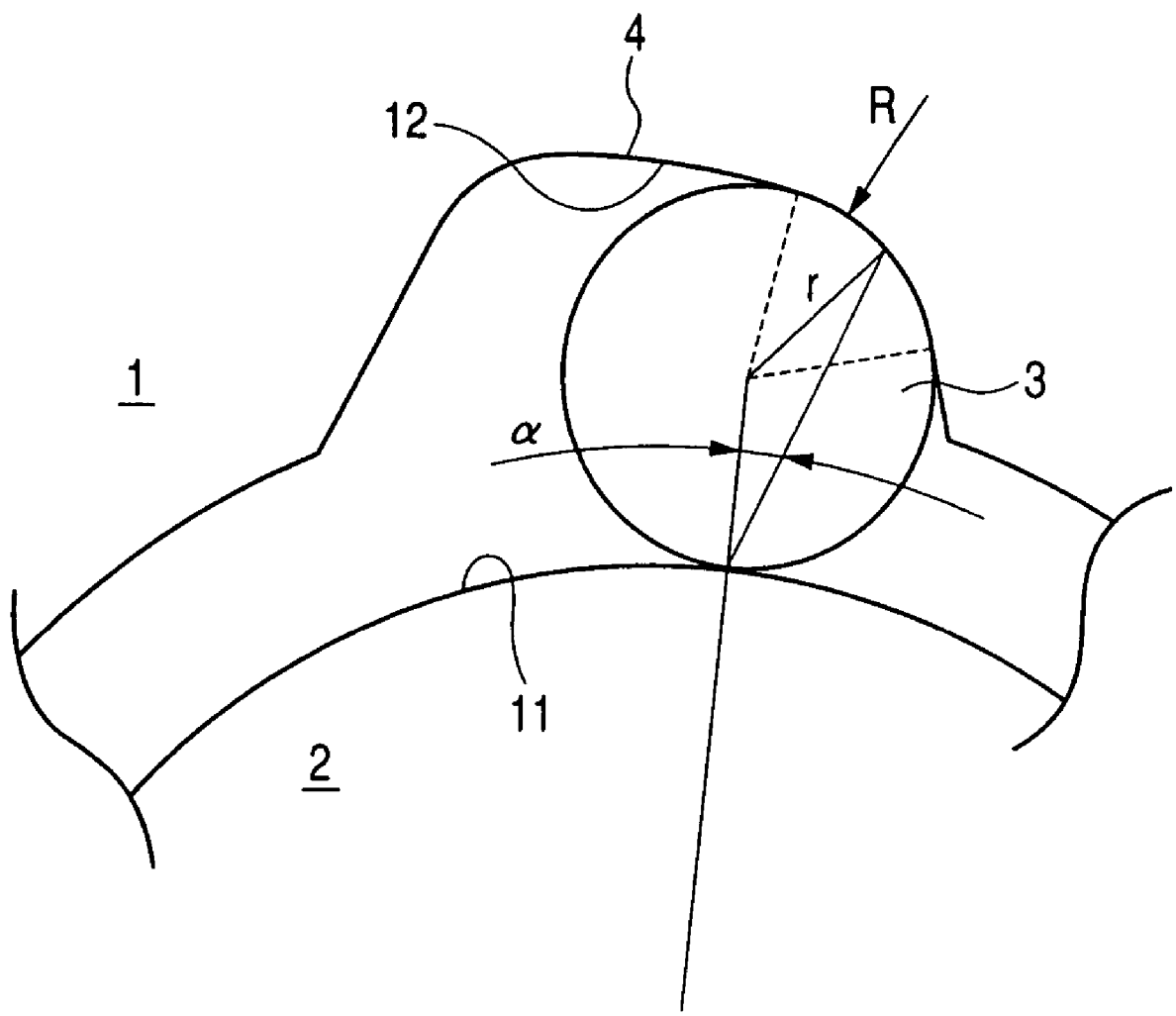
FIG. 3 is a partial enlarged view showing a relationship between a roller and a cam surface.

As shown in FIGS. 1 and 3, in each of the recessed portions 4 provided in the inner periphery of the outer race 1, a radial height of a left side (FIGS. 1 and 4) of the recessed portion is greater than that of a right side. Accordingly, when the rollers 3 are positioned at the right sides of the recessed portions 4 by the relative rotation between the outer race 1 and the inner race 2, the rollers 3 are engaged by the cam surfaces 12, thereby transmitting the torque.

The outer race 1 is provided at its inner diameter edge with substantially annular stepped portions 16 into which annular portions 15 of the annular spring 5 are fitted. Thus, any movement of the annular spring in the opposite direction is regulated by the engagement between the annular spring 5 and the stepped portions 16. As a result, even if the roller-type one-way clutch 30 is inclined toward a flange portion 17 of the cage 6, since the annular portions 15 of the annular spring 5 are engaged with the outer race 1 and the curved portions 9 are fitted in the cage 6, internal parts such as the rollers 3 can be prevented from being dislodged.

By inserting the annular spring 5 in the stepped portions 16 of the outer race 1 and by centering the annular spring 5, the annular spring 5 is prevented from being dislodged in the axial direction and synchronization of the rollers can be realized.

A circumferential width of the pocket portion 10 of the cage 6 is set to be smaller than a diameter of the roller 3. Accordingly, since the rollers 3 are not dropped toward the inner diameter side, the one-way clutch can be assembled as an integrated structure.

In correspondence to the recessed portions 4 of the outer race 1, the outer race is provided at its one axial end surface with grooves 7 extending in the radial direction and communicated with the corresponding recessed portions 4. The grooves 7 may be formed, for example, by a sintering mold. During the operation of the roller-type one-way clutch, although dust and/or other foreign matters may be accumulated in the recessed portions 4 having the cam surfaces 12, such foreign matters are discharged outside through the grooves 7. Thus, a poor operation of the clutch due to dust accumulation can be prevented. The grooves 7 may be formed in both axial end surfaces of the outer race 1.

As shown in FIG. 2, the end 13 of the annular spring 5 is bent axially inwardly to abut against the inner peripheral surface of the outer race 1. Further, the other end 14 of the annular spring 5 is fitted into the pocket portion 10 of the cage 6. With this arrangement, it is possible to facilitate that the cage 6 is urged toward the engaging direction of the rollers 3.

Further, the annular spring 5 may not be a standard C-shaped spring but can be formed from a wire material or a leaf spring material having greater applicability.

FIG. 3 is a partial enlarged view showing a relationship between the roller and the cam surface. The roller 3 is positioned at a higher load side of the cam surface 12. In this condition, the roller having a radius r is face-contacted with the cam surface 12 having a curvature R. The roller 3 may be point-contacted with one point on the cam surface 12. In this case, in order to engage the roller 3 with the track race, i.e. inner race 2, when it is assumed that the engaging angle or thrust angle is a, it is necessary to establish the following relationship:

$$\tan \alpha < \mu$$

That is to say, tan a must be smaller than coefficient of friction of the roller 3. When the engaging angle α for intentionally generating the slip on the cam surface is set to become greater than 6 degrees, abrupt hopping of the roller 3 (a phenomenon in which, during the engagement of the roller, any load is reduced or lost due to the slippage and the like, with the result that the roller is suddenly fallen toward the idle rotation side) can be prevented. In this way, the damage of the one-way clutch can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-107141 filed Apr. 10, 2006, which is hereby incorporated by reference herein in its entirety.

What is claimed is:

1. A roller type one-way clutch comprising:

an annular outer race provided at its inner periphery with a cam surface;

an inner race spaced apart from said outer race at a radially inner diameter side of said outer race, disposed in coaxially with said outer race for a relative movement therewith, and having an annular outer peripheral track surface;

a cage having a plurality of radially penetrating pockets;

a plurality of rollers disposed between said outer race and said inner race and adapted to transmit torque between said outer peripheral track surface and said cam surface, each roller being disposed in one of the pockets of said cage;

and a C-shaped annular spring having a plurality of curved portions, each curved portion being fitted into one of the pockets of said cage, wherein said annular spring biases, through said cage, said rollers toward a direction in which said rollers are engaged by said cam surface.

2. A roller-type one-way clutch according to claim 1, wherein one end of said annular spring is engaged with said outer race and another end of said annular spring is fitted into one of the pockets of said cage.

3. A roller-type one-way clutch according to claim 2, wherein said annular spring is formed from a wire material or a leaf spring material.

4. A roller-type one-way clutch according to claim 1, wherein an engaging angle for generating slippage at a higher load side of said cam surface is set to become greater than 6 degrees, and said roller is point-contacted or face-contacted with said cam surface.

5. A roller-type one-way clutch according to claim 1, wherein each curved portion of the annular spring projects radially inward and is fitted into the corresponding pocket of said cage from a radially outward side of said cage.

6. A roller-type one-way clutch according to claim 1, wherein said annular spring is engaged with an annular stepped portion on a radially inner edge of the outer race.

* * * * *